United States Patent
Ordy et al.

(10) Patent No.: US 10,360,306 B2
(45) Date of Patent: Jul. 23, 2019

(54) MONITORING OF A MAINTENANCE INTERVENTION ON AN AIRCRAFT

(71) Applicant: Airbus (S.A.S.)

(72) Inventors: Bernard Ordy, Blagnac (FR); Alexis Jacquemin, Maurens (FR); Sylvain Chamaillard, Toulouse (FR); Eric Jastrzebski, Plaisance du Touch (FR)

(73) Assignee: Airbus (S.A.S.), Blagnac (FR)

( * ) Notice: Subject to any disclaimer, the term of this patent is extended or adjusted under 35 U.S.C. 154(b) by 737 days.

(21) Appl. No.: 14/808,863

(22) Filed: Jul. 24, 2015

(65) Prior Publication Data

US 2016/0031570 A1    Feb. 4, 2016

(30) Foreign Application Priority Data

Jul. 29, 2014 (FR) ...................................... 14 57324

(51) Int. Cl.
*G06F 17/28*   (2006.01)
*G06F 17/27*   (2006.01)
(Continued)

(52) U.S. Cl.
CPC ................ *G06F 17/28* (2013.01); *B64F 5/40* (2017.01); *G02B 27/0093* (2013.01);
(Continued)

(58) Field of Classification Search
None
See application file for complete search history.

(56) References Cited

U.S. PATENT DOCUMENTS

| | | |
|---|---|---|
| 5,926,790 A | 7/1999 | Wright |
| 2003/0202638 A1* | 10/2003 | Eringis ............... H04M 3/22 |
| | | 379/15.01 |

(Continued)

FOREIGN PATENT DOCUMENTS

FR    2 917 195 A1    12/2008

OTHER PUBLICATIONS

French Search Report for Application No. 1457324 dated Jan. 13, 2015.

*Primary Examiner* — Gurkanwaljit Singh
(74) *Attorney, Agent, or Firm* — Jenkins, Wilson, Taylor & Hunt, P.A.

(57) ABSTRACT

The disclosure herein relates to ensuring the mutual understanding between a remote maintenance support engineer guiding a maintenance engineer intervening on an aircraft, and concerns a system of prevention comprising first and second communication terminals to enable the maintenance engineer and remote maintenance support engineer to exchange information with each other, the information including oral guidance instructions given by the maintenance support engineer and oral responses given by the maintenance engineer relating to the execution of the instructions, a voice recognition device configured for transforming the oral instructions and responses into textual instructions and responses, a semantic analysis device configured for comparing the textual instructions with the textual responses in order to detect any possible inconsistency between the instructions and the responses, and a warning device configured for generating a warning when an inconsistency is detected between the instructions and the responses.

9 Claims, 6 Drawing Sheets

(51) Int. Cl.
*G10L 15/26* (2006.01)
*G06Q 10/06* (2012.01)
*G06F 3/01* (2006.01)
*G02B 27/00* (2006.01)
*G06F 11/32* (2006.01)
*G10L 15/18* (2013.01)
*G05B 19/418* (2006.01)
*G06Q 10/00* (2012.01)
*B64F 5/40* (2017.01)
*G02B 27/01* (2006.01)

(52) U.S. Cl.
CPC .......... *G05B 19/418* (2013.01); *G06F 3/016* (2013.01); *G06F 11/32* (2013.01); *G06F 17/2785* (2013.01); *G06Q 10/06398* (2013.01); *G06Q 10/20* (2013.01); *G10L 15/1822* (2013.01); *G10L 15/26* (2013.01); *G02B 2027/014* (2013.01); *G02B 2027/0178* (2013.01); *G05B 2219/35453* (2013.01); *G05B 2219/35495* (2013.01)

(56) References Cited

U.S. PATENT DOCUMENTS

| | | | |
|---|---|---|---|
| 2004/0143428 A1* | 7/2004 | Rappaport | G06F 17/509 703/22 |
| 2007/0083300 A1 | 4/2007 | Mukheriee | |
| 2007/0100583 A1 | 5/2007 | Yano et al. | |
| 2007/0213988 A1 | 9/2007 | Hanson | |
| 2011/0122890 A1* | 5/2011 | Johnson | H04L 12/413 370/468 |
| 2012/0053777 A1* | 3/2012 | Meisels | G07C 5/006 701/29.1 |
| 2013/0127980 A1* | 5/2013 | Haddick | G06F 3/013 348/14.08 |
| 2013/0278631 A1* | 10/2013 | Border | G02B 27/017 345/633 |
| 2014/0207419 A1* | 7/2014 | Messinger | G01N 27/90 703/1 |
| 2015/0120388 A1* | 4/2015 | Tan | G06F 3/016 705/7.32 |
| 2015/0242800 A1* | 8/2015 | Ellenby | G06Q 10/063114 705/7.15 |

* cited by examiner

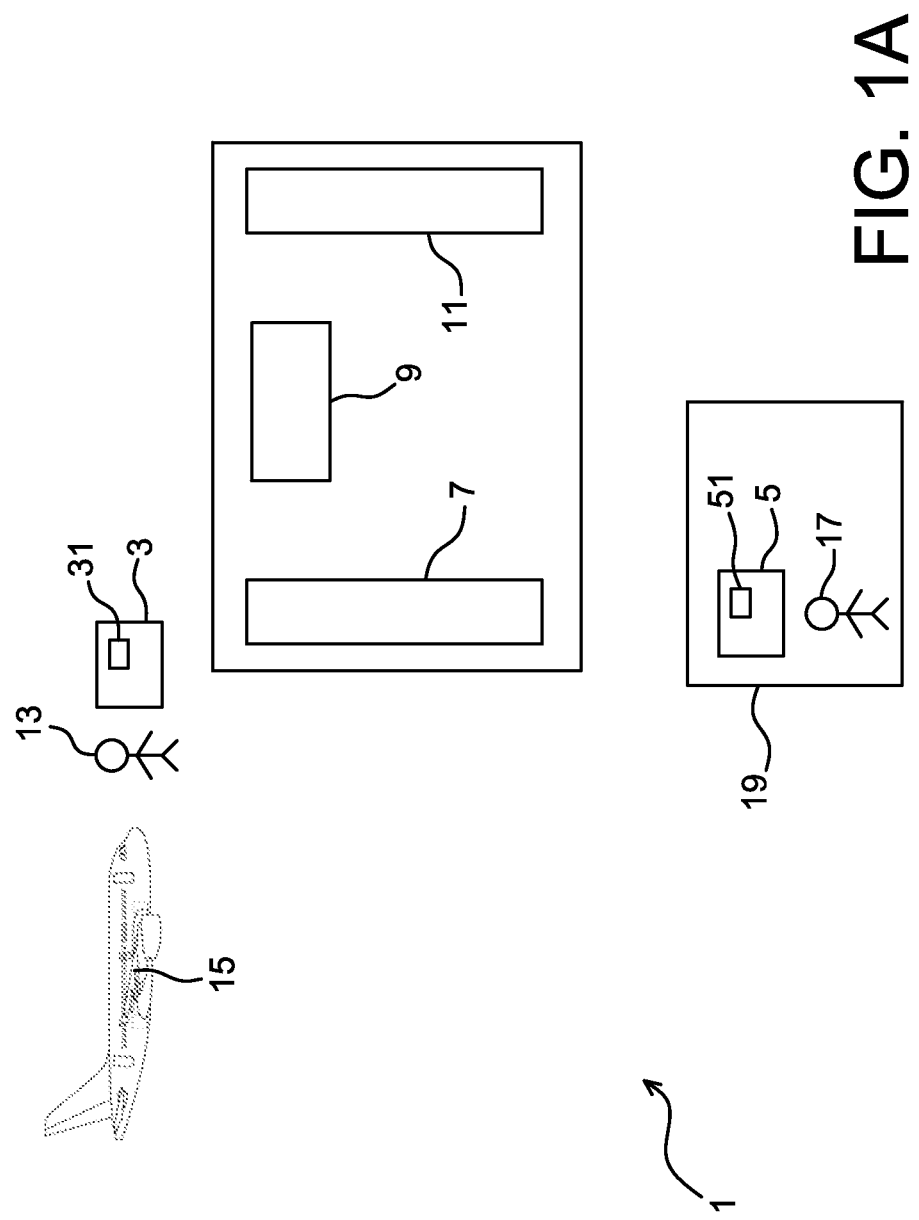

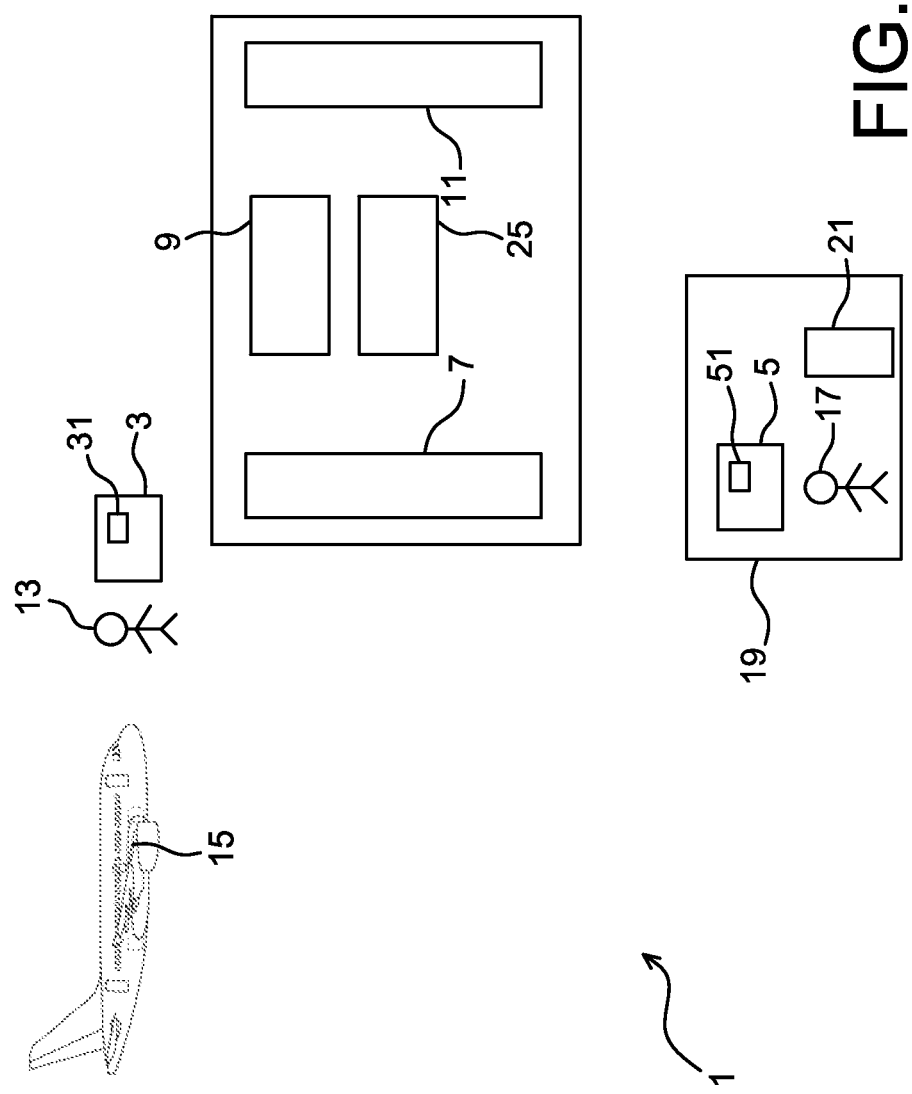

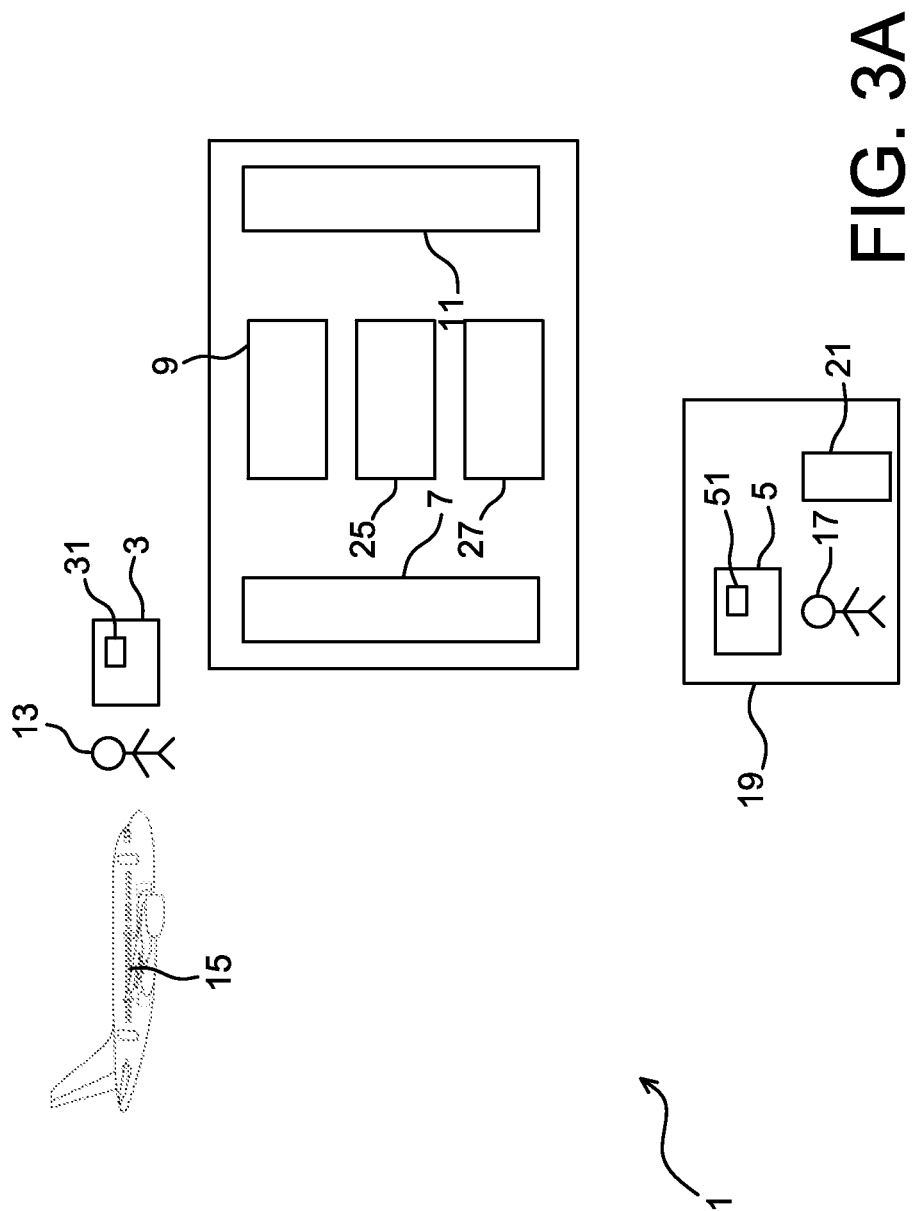

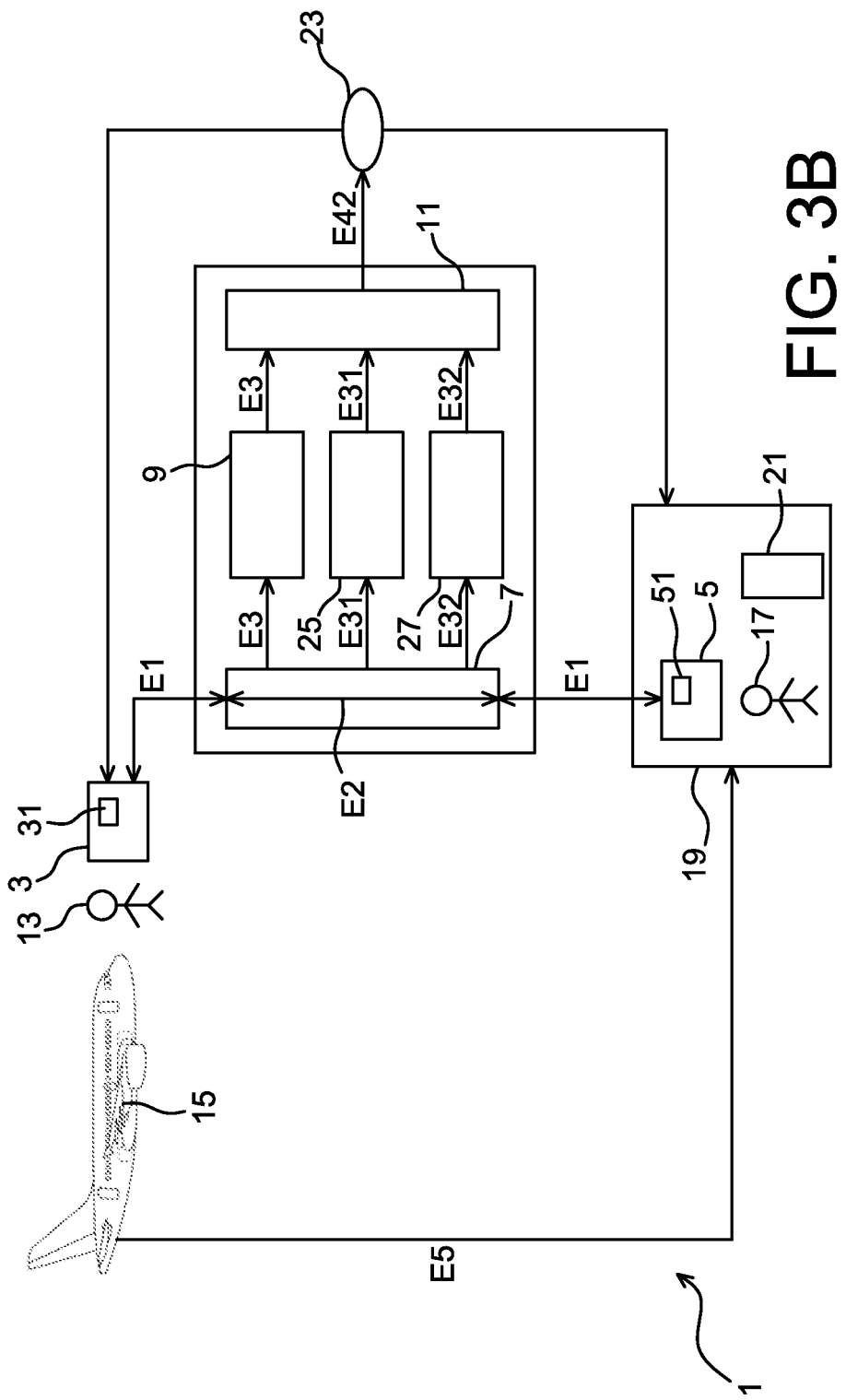

MONITORING OF A MAINTENANCE INTERVENTION ON AN AIRCRAFT

CROSS-REFERENCE TO RELATED APPLICATION

This application claims the benefit of the French patent application No. 14 57324 filed on Jul. 29, 2014, the entire disclosure of which is incorporated herein by reference.

BACKGROUND

The present disclosure relates to the field of aircraft maintenance operations. In particular, the disclosure herein concerns a method and a system for monitoring an intervention by a maintenance engineer on an aircraft when the maintenance engineer is remotely guided by a maintenance support engineer.

A Line Maintenance Engineer (LME) performing maintenance operations on an aircraft may be remotely guided by a Remote Maintenance Support Staff (RMSS) maintenance support engineer located in a maintenance center. The maintenance support engineer may provide instructions directly to the maintenance engineer, regarding the manipulations to be performed, and guide the maintenance engineer precisely in the execution of tricky tasks. Guidance is given by voice communication by mobile phones or optionally by walkie-talkie if the maintenance support engineer is located in close proximity to the aircraft or by VHF if the distance between the support engineer and the maintenance engineer is very great. At the end of maintenance activity, the maintenance support engineer must validate and take responsibility for the actions performed by the maintenance engineer. Thus, the support engineer can ensure that the instructions issued by same have been correctly understood and followed by the maintenance engineer. Similarly, the support engineer must ensure that nothing further has been carried out during the maintenance intervention.

In addition, during a complex intervention, the assistance of the support engineer enables the efficiency of the maintenance engineer to be increased. Indeed, the maintenance engineer may be confronted with a new problem requiring expertise that may already be known to the support engineer or which can be easily found by the latter from documents and/or from other support engineers.

However, the airport environment is noisy, which may impair understanding during voice communication between the maintenance engineer and the support engineer. Moreover, in the context of information exchange, the part of interpretation is important, which may distort both the understanding of the instructions received by the maintenance engineer and the response of same to the maintenance support engineer.

The subject matter of the present disclosure is therefore to remedy the aforementioned disadvantages by providing a method and a system for monitoring the intervention by a maintenance engineer on an aircraft, that are simple to implement and that can automatically detect any inconsistency between the instructions given by the maintenance support engineer and the responses of the maintenance engineer.

SUMMARY

The present disclosure is aimed at automatically detecting and reporting any inconsistency in understanding between a maintenance engineer and a remote support engineer exchanging information and concerns a system for monitoring maintenance intended for monitoring an intervention by a maintenance engineer on an aircraft remotely guided by a maintenance support engineer, comprising:

first and second communication terminals intended to enable the maintenance engineer and remote maintenance support engineer to exchange information with each other, the information including oral guidance instructions given by the maintenance support engineer and oral responses given by the maintenance engineer relating to the execution of the instructions, a voice recognition device configured for translating the oral instructions and responses into textual instructions and responses, a semantic analysis device configured for comparing the textual instructions with the textual responses in order to detect any possible inconsistency between the instructions and the responses, and a warning device configured for generating a warning when an inconsistency is detected between the instructions and the responses.

The disclosure herein is also aimed at the detection of any divergence of maintenance actions with respect to a theoretical maintenance procedure described in maintenance documents and/or with respect to changes of states of the aircraft.

BRIEF DESCRIPTION OF THE DRAWINGS

Other features and advantages of the system and method according to the disclosure herein will appear better on reading the description given below, as a non-restrictive guide, with reference to the accompanying drawings in which:

FIG. 1A schematically illustrates a system for monitoring maintenance on an aircraft, according to one embodiment of the disclosure herein;

FIG. 2A schematically illustrates a system for monitoring maintenance on an aircraft, according to another embodiment of the disclosure herein;

FIG. 3A schematically illustrates a system for monitoring maintenance on an aircraft, according to yet another embodiment of the disclosure herein; and FIG. 3B illustrates a method for monitoring maintenance on an aircraft, according to the embodiment in FIG. 3A.

DETAILED DESCRIPTION

Figure 1B:
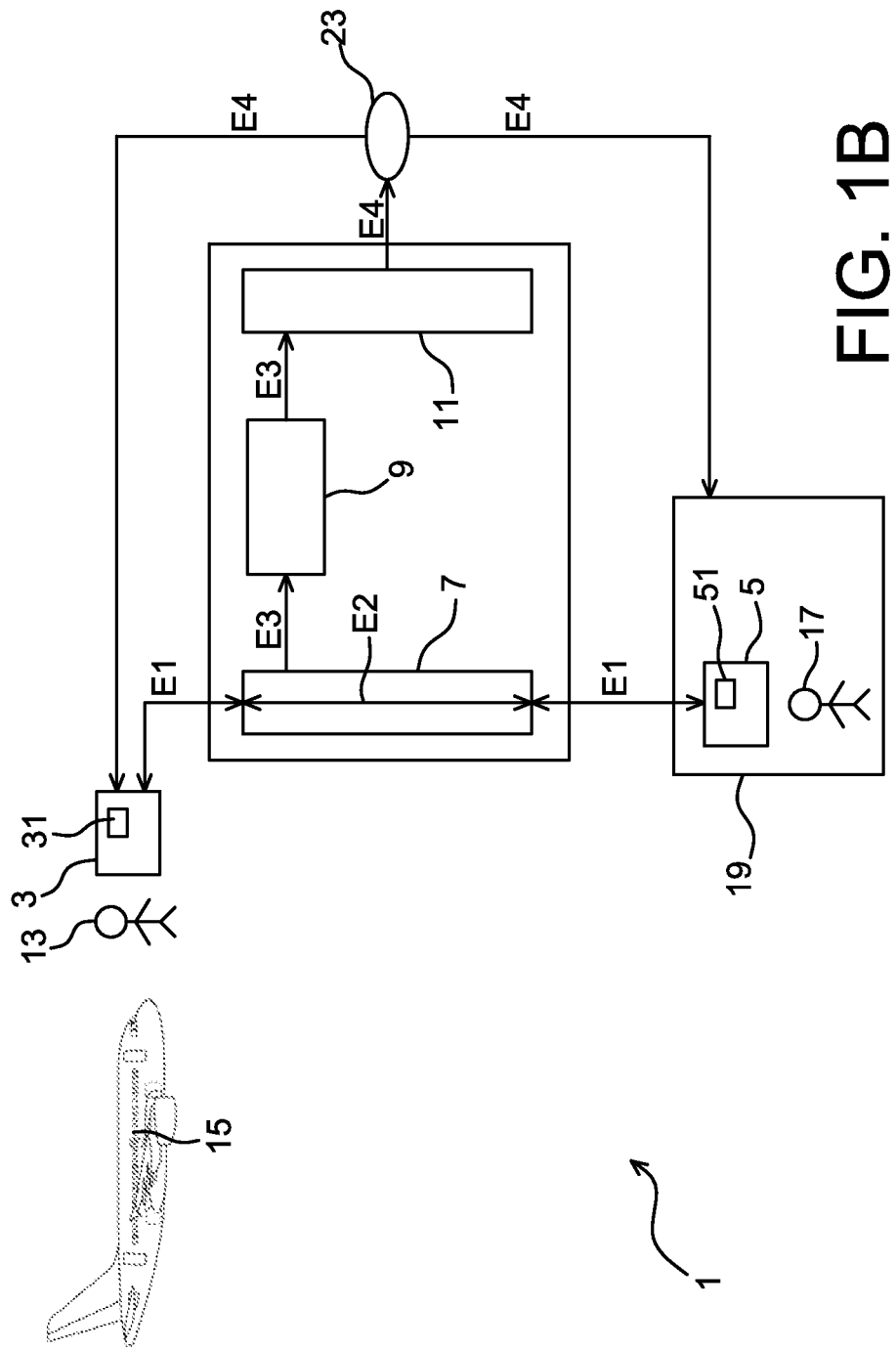
FIG. 1B illustrates a method for monitoring maintenance on an aircraft, according to the embodiment in FIG. 1A.

A principle of the disclosure herein comprises monitoring an intervention by a maintenance engineer on an aircraft remotely guided by a maintenance support engineer by automatically comparing the instructions given orally by the maintenance support engineer with the oral responses of the maintenance engineer in order to ensure the mutual understanding of the participants and warn same in the event of misunderstanding.

FIG. 1A schematically illustrates a system for monitoring maintenance on an aircraft, according to one embodiment of the disclosure herein.

In accordance with the disclosure herein, the maintenance monitoring system 1 comprises first and second communication terminals 3, 5, a voice recognition device 7, a semantic analysis device 9, and a warning device 11.

The communication terminals 3, 5 are, for example, mobile phones, walkie-talkies, laptop computers, etc. A first mobile communication terminal 3 is intended for a maintenance engineer 13 located in or around an aircraft 15 and a second communication terminal 5 is intended for a maintenance support engineer 17 located in a maintenance center 19. These first and second communication terminals 3, 5 enable the maintenance engineer 13 and remote maintenance support engineer 17 to exchange information between them.

The voice recognition device 7 is in a known way a computer application for analyzing speech for transcribing same in the form of a text. Similarly, the semantic analysis device 9 is in a known way a computer application for establishing the meaning of a message using the sense of the words in the text (see, for example, 'semantic analysis' in Wikipedia).

Each communication terminal 3, 5 normally includes a receiving/transmitting unit (e.g. a modem), an input unit (e.g. a microphone, a keyboard), a processing unit, a memory and an output unit (e.g. earphones, headphone set, a screen). It will be noted that the memory may comprise a computer program including code instructions suitable for the implementation of the monitoring method according to the disclosure herein.

FIG. 1B illustrates a method for monitoring maintenance on an aircraft, according to the embodiment in FIG. 1A.

In step E1, a maintenance engineer 13 who has to intervene on an aircraft 15 calls a maintenance support engineer 17 via the first communication terminal 3 and the voice recognition device 7 to assist him in the performance of a maintenance task. The maintenance support engineer 17 then guides the maintenance engineer 13 in performing this via the second communication terminal 5 and the voice recognition device 7.

Indeed, the maintenance support engineer 17, on the basis of the maintenance tasks in the aircraft's documentation 21, gives oral instructions to the maintenance engineer 13. It will be noted that the designations of the components of the aircraft 15 or the environment thereof, the functions or parameters of the aircraft, tools and maintenance actions are described by a standard aeronautical vocabulary limited to the task to be performed. Similarly, the instructions and the exchange between the maintenance support engineer 17 and the maintenance engineer 13 follow the same codes. The vocabulary used is generally reduced to the strict minimum. Thus, the maintenance support engineer 17 and the maintenance engineer 13 use in their sentences a number of keywords (type of action, generic name of the system, equipment number associated with the action) listed in a predefined dictionary of keywords which is actually an extract from the maintenance documentation. The instructions may, for example, take the following form: 'deactivate the Fuel system', 'dismantle panel VUxxx', etc.

The maintenance engineer 13 executes the instruction and orally gives the response or the result of the latter's action. The result may, for example, take the following form: 'Fuel System deactivated', "VUxxx panel dismantled", etc.

In step E2, the voice recognition device 7 is configured for translating the oral guidance instructions given by the maintenance support engineer 17 and the oral responses given by the maintenance engineer 13 relating to the execution of the instructions into textual instructions and textual responses.

Advantageously, the voice recognition device 7 is configured for retranscribing the instructions and results onto screens 31, 51 of the first and second communication terminals 3, 5. Thus, the maintenance engineer 13 and the maintenance support engineer 17 have the possibility if necessary of correcting the instructions and results by relaunching the processing procedure in the voice recognition device.

In step E3, the semantic analysis device 9 is intended to carry out a semantic analysis and an identification of keywords or key phrases. This device 9 is capable if necessary of extracting keywords from the instructions and results retranscribed by the voice recognition device 7 and performing the semantic comparison between these keywords or the phrases per se. It will be noted that the comparison is made on all the words of the instruction (i.e. subject, verb, complement, etc.).

Thus, the semantic analysis device 9 is configured for comparing the textual instructions with the textual responses in order to ensure the mutual understanding of the participants 13, 17 and optionally to detect any inconsistency between the instructions and the responses. For example, if the system name or the panel number mentioned by the maintenance support engineer 17 has been misunderstood by the maintenance engineer 13, the semantic analysis device 9 will be able to detect it.

The voice recognition 7 and semantic analysis 9 devices are self-adaptive and are capable of self-learning thereby increasing the overall efficiency of voice recognition and the detection of anomalies.

In event of failure during voice recognition or the detection of anomalies or of misunderstanding between the participants, the semantic analysis device 9 transmits these anomalies to the warning device 11.

Indeed, in step E4, the warning device 11 is configured for generating a warning 23 when an inconsistency is detected between the instructions and the responses. Advantageously, the warning device 11 is configured for sending the warning 23 simultaneously to the maintenance support engineer 17 and to the maintenance engineer 13. According to one variant, the warning device 11 is configured for sending the warning 23 only to one of them.

Moreover, depending on the seriousness of the anomaly, the warning device 11 may use different ways of possible warnings and of different levels. Indeed, the warning device 11 may activate display and/or audible and/or light and/or vibration devices on the communication terminals 3, 5 carried by the maintenance support engineer 17 and/or the maintenance engineer 13. For example, sounds may be emitted by the mobile terminal or by a headphone set worn by the maintenance support engineer 17 and/or the maintenance engineer 13 and optionally, the light and/or vibration devices are triggered in the communication terminals 3, 5.

Furthermore, it will be noted that the voice recognition 7, semantic analysis 9 and warning 11 devices are modules which advantageously may be included in the first 3 and/or the second 5 communication terminal. These modules 7, 9, 11 are, for example, implemented by one or more application(s) integrated into the communication terminal(s). In a variant, the voice recognition 7 and semantic analysis 9 devices may be installed on a remote device.

FIG. 2A schematically illustrates a system for monitoring maintenance on an aircraft, according to another embodiment of the disclosure herein.

The maintenance monitoring system 1 comprises a content comparator 25 in addition to the voice recognition 7, semantic analysis 9, warning 11 devices and communication terminals 3, 5. The content comparator 25 is suitable for comparing the instructions and responses with the information contained in the document 21 describing the maintenance procedures.

Figure 2B:
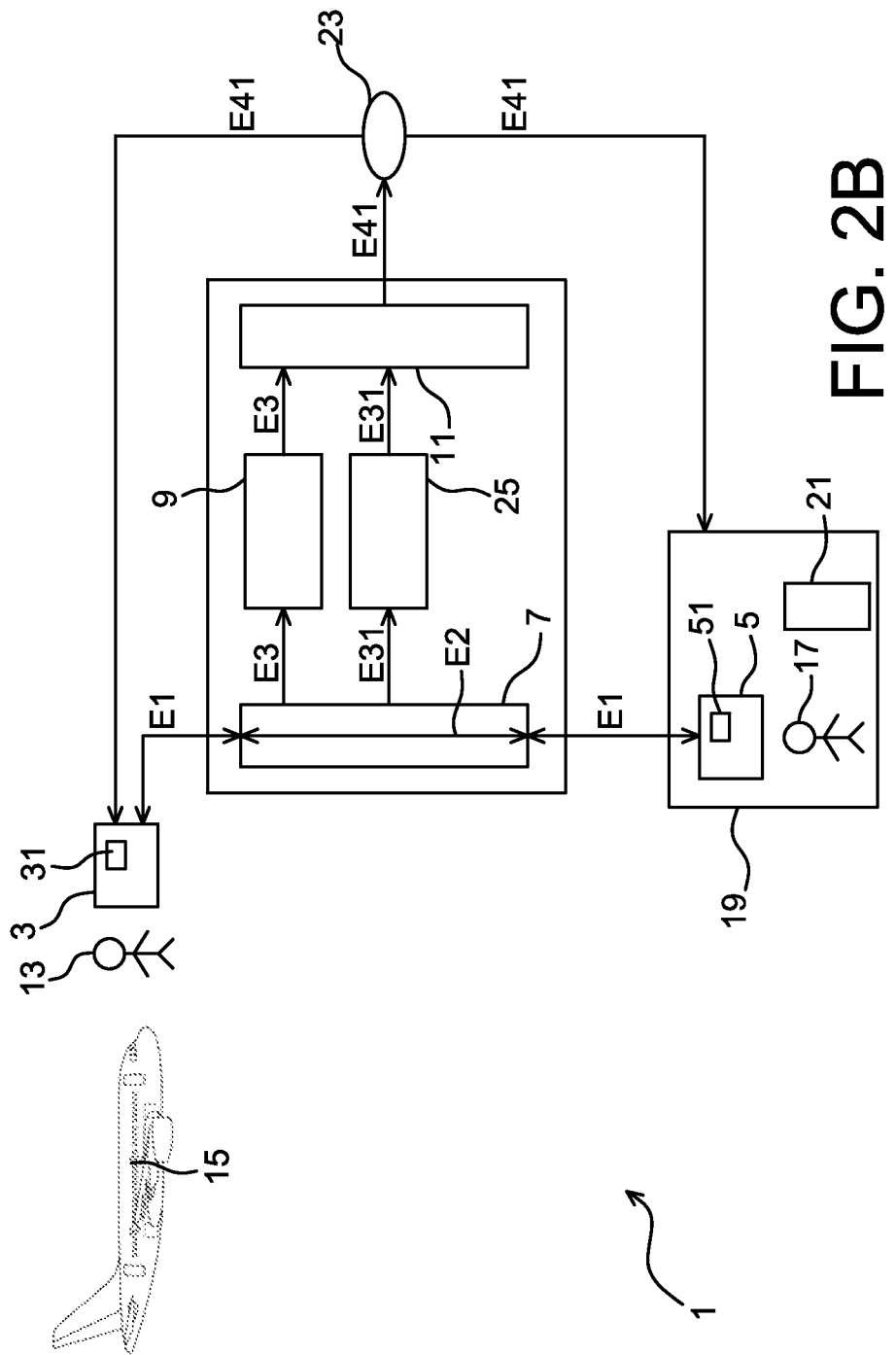
FIG. 2B illustrates a method for monitoring maintenance on an aircraft, according to the embodiment in FIG. 2A.

FIG. 2B illustrates a method for monitoring maintenance on an aircraft, according to the embodiment in FIG. 2A.

Steps E1 through E3 are identical to those of FIG. 1B. Indeed, in step E1, the maintenance support engineer 17 and the maintenance engineer 13 orally exchange instructions and responses between them. In steps E2 and E3, the instructions given by the maintenance support engineer 17 are compared with the results of the execution of instructions reported by the maintenance engineer 13.

In a step E31, the content comparator 25 is configured for comparing at least one portion of the textual instructions and results with theoretical maintenance task data contained in the maintenance procedure document 21 in order to detect any inconsistency. It will be noted that this step may advantageously be carried out in parallel with step E2.

More particularly, the content comparator 25 is used to compare the instructions given by the maintenance support engineer 17 with the maintenance task data contained in the procedure document 21 in order to avoid the maintenance support engineer 17 leading the maintenance engineer 13 into error.

In the event of detecting any divergence or inconsistency between theoretical maintenance task data on the one hand and the textual instructions and results on the other, the content comparator 25 transmits these inconsistencies to the warning device 11.

In step E41, the warning device 11 is configured for generating a warning 23 when an inconsistency is detected between the instructions and the responses and/or when an inconsistency is detected between theoretical maintenance task data with the textual instructions and results.

FIG. 3A schematically illustrates a system for monitoring maintenance on an aircraft, according to yet another embodiment of the disclosure herein.

The maintenance monitoring system 1 comprises a status comparator 27 in addition to the content comparator 25, the voice recognition 7, semantic analysis 9, warning 11 devices and communication terminals 3, 5. The status comparator 27 is suitable for comparing the parameters coming from the aircraft with the actions requested in the maintenance procedures.

Indeed, the maintenance center 19 in which the maintenance support engineer 17 is located obtains in real time from the aircraft 15 a certain amount of information which is useful for performing this comparison. As an example, this information comprises the status of the aircraft systems (activated, not activated, etc.), failures, downloads/uploads performed and much other information. Thus, a number of actions carried out by the maintenance engineer 13 on the aircraft 15 are visible through the information received by the maintenance support engineer 17.

FIG. 3B illustrates a method for monitoring maintenance on an aircraft, according to the embodiment in FIG. 3A.

Steps E1 through E31 are identical to those of FIG. 2B. Step E1, concerns the oral exchanges between the maintenance support engineer 17 and the maintenance engineer 13. Steps E2 and E3, concern the comparison of the instructions with the responses relating to the execution of the instructions. Step E31, concerns the comparison of instructions and textual results with theoretical maintenance task data.

In step E32, the status comparator 27 is configured for comparing a set of parameters of the aircraft received (arrow E5) in real time from the aircraft 15 with theoretical maintenance task data contained in the procedure document 21 in order to ensure the correct execution of operations carried out by the maintenance engineer 13.

Steps E31 and E32 are used to ensure that the oral exchanges (instructions and responses) correspond correctly to what is required in the maintenance procedure and reflect the current state of the aircraft.

In the event of detecting any divergence or inconsistency between theoretical maintenance task procedure data and the aircraft's parameters, the status comparator 27 transmits these inconsistencies to the warning device 11.

In step E42, the warning device 11 is configured for generating a warning 23 when an inconsistency is detected between the instructions and the responses and/or when an inconsistency is detected between theoretical maintenance task data with the textual instructions and results, and/or when an inconsistency is detected between theoretical maintenance task procedure data and the aircraft's parameters.

Thus, a warning is generated in the event of failure during voice recognition or semantic analysis, in the event of misunderstanding between the interlocutors 13, 17, in the event of non-compliance with procedures by the maintenance support engineer 17 (an instruction error) or by the maintenance engineer 13 (error in carrying out an instruction), and when the results of voice recognition or comparisons do not allow it to be concluded that the planned task has been successfully completed.

According to yet another embodiment, the maintenance monitoring system 1 comprises an automatic translation device in addition to the devices illustrated in any of FIGS. 1A-3A. The translation device is in a known way a computer application that translates oral or textual messages from one language to another. This device can thus be used to translate the instructions and/or responses of any of the interlocutors into the language of the other interlocutor in the event that the maintenance engineer and the maintenance support engineer do not use the same language.

The present disclosure enables the number of errors during the execution of maintenance to be reduced and checks that the maintenance actions requested and guided by the maintenance support engineer have actually been carried out by the maintenance engineer. This enables the maintenance support engineer to endorse the actions performed with confidence.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A maintenance monitoring system for monitoring an intervention by a maintenance engineer on an aircraft remotely guided by a maintenance support engineer, comprising:
    first and second communication terminals configured to enable the maintenance engineer and remote maintenance support engineer to exchange information with each other, the information including oral guidance instructions given by the maintenance support engineer and oral responses given by the maintenance engineer relating to execution of the instructions;
    a voice recognition device configured for transforming the oral instructions and responses into textual instructions and textual responses;
    a semantic analysis device configured for extracting one or more instruction keywords from the textual instructions and one or more response keywords from the textual responses and comparing the textual instructions, including the one or more instruction keywords, with the textual responses, including the one or more response keywords, in order to detect any possible inconsistency between the textual instructions and the textual responses; and
    a warning device configured for generating a warning when an inconsistency is detected between the textual instructions and the textual responses.

2. The system as claimed in claim 1 further comprising:
    a content comparator configured for comparing at least one portion of the textual instructions and results with theoretical maintenance task data contained in a maintenance procedure document; and
    the warning device being configured for generating a warning when an inconsistency is detected between theoretical maintenance task data and the textual instructions and results.

3. The system as claimed in claim 2 further comprising:
    a status comparator configured for comparing in real time a set of parameters coming from the aircraft with theoretical maintenance task data contained in the maintenance procedure document; and
    the warning device being configured for generating a warning when an inconsistency is detected between theoretical maintenance task procedure data and the aircraft's parameters.

4. The system as claimed in claim 1, wherein the voice recognition device is configured for retranscribing the instructions and results onto the first and second communication terminals.

5. The system as claimed in claim 1, wherein the warning device is configured for simultaneously sending the warning to the maintenance support engineer and to the maintenance engineer or only to one of them.

6. The system as claimed in claim 1, wherein the voice recognition and semantic analysis devices are suitable for self-learning.

7. The system claimed in claim 1, comprising a translation device.

8. The system as claimed in claim 1, wherein the voice recognition, semantic analysis and warning devices are installed in the first and second communication terminals.

9. A method for monitoring an intervention by a maintenance engineer on an aircraft remotely guided by a maintenance support engineer, comprising:
    providing a first communication terminal and a second communication terminal, both configured to enable an exchange of information, the information comprising oral guidance instructions and oral responses relating to an execution of the instructions;
    exchanging information, including the oral guidance instructions, between the maintenance engineer and the remote maintenance support engineer via the first communication terminal and the second communication terminal;
    executing steps of the oral guidance instructions on the aircraft;
    communicating the oral response between the first communication terminal and the second communication terminal, that steps of the oral guidance instructions have been executed;
    transforming, by a voice recognition device, the oral instructions and oral responses into textual instructions and textual responses;
    using a semantic analysis device to extract one or more instruction keywords from the textual instructions and one or more response keywords from the textual responses;
    comparing, by the semantic analysis device, the textual instructions, including the one or more instruction keywords, with the textual responses, including the one or more response keywords, in order to detect any possible inconsistency between the textual instructions and the textual responses; and
    generating a warning by a warning device, when an inconsistency is detected between the textual instructions and the textual responses.

* * * * *